US008679226B2

(12) United States Patent  
Parsons

(10) Patent No.: US 8,679,226 B2  
(45) Date of Patent: Mar. 25, 2014

(54) VACUUM SYSTEM FOR MEMBRANE FUEL STABILIZATION UNIT

(75) Inventor: Douglas A. Parsons, Canton, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1301 days.

(21) Appl. No.: 12/495,897

(22) Filed: Jul. 1, 2009

(65) Prior Publication Data

US 2009/0266229 A1 Oct. 29, 2009

Related U.S. Application Data

(62) Division of application No. 11/302,910, filed on Dec. 14, 2005, now Pat. No. 7,571,596.

(51) Int. Cl.
*B01D 19/00* (2006.01)

(52) U.S. Cl.
USPC .................................................. 95/46

(58) Field of Classification Search
USPC ............... 95/46; 123/73 AD, 196 A, 196 R; 60/39.08, 734, 39.091, 39.094, 779, 60/772; 184/6.11, 6.12
See application file for complete search history.

(56) References Cited

U.S. PATENT DOCUMENTS

| 4,631,009 | A | | 12/1986 | Cygnor et al. |
| 5,587,068 | A | * | 12/1996 | Aho et al. ................... 96/210 |
| 5,615,547 | A | | 4/1997 | Beutin et al. |
| 6,315,815 | B1 | | 11/2001 | Spadaccini et al. |
| 6,709,492 | B1 | * | 3/2004 | Spadaccini et al. ................ 96/6 |
| 7,260,926 | B2 | | 8/2007 | Sabatino et al. |
| 7,377,110 | B2 | | 5/2008 | Sheridan et al. |
| 2005/0166597 | A1 | | 8/2005 | Spadaccini et al. |
| 2005/0217272 | A1 | | 10/2005 | Sheridan et al. |

FOREIGN PATENT DOCUMENTS

| EP | 1 559 884 A2 | 8/2005 |
| EP | 1 579 901 A1 | 9/2005 |
| JP | 4347336 | 12/1992 |
| WO | 2005/025718 | 3/2005 |

OTHER PUBLICATIONS

European Search Report for EP Application No. 06256305.1, Jun. 14, 2010.

* cited by examiner

*Primary Examiner* — Lindsay Low  
*Assistant Examiner* — Jacob Amick  
(74) *Attorney, Agent, or Firm* — Carlson, Gaskey & Olds, P.C.

(57) ABSTRACT

Oil system components for a turbine engine are used to provide a vacuum system for a fuel stabilization unit (FSU). A vacuum system pulls oxygen and other contaminants from fuel into a vacuum chamber within the FSU. The vacuum system pumps the discharge through a vacuum outlet in the FSU toward a vacuum pump. Due to the quality of vacuum required, a two-stage vacuum pump is used. A first stage vacuum pump is an oil system scavenge pump for the turbine engine and the second stage vacuum is provided by a second stage vacuum pump. The discharge flows from the vacuum chamber through to the second stage vacuum pump and is then added to the oil supply. The oil and discharge mixture is sent through an oil system de-oiler and a de-aerator to clean the oil supply prior to pumping the oil back through the oil system.

11 Claims, 2 Drawing Sheets

VACUUM SYSTEM FOR MEMBRANE FUEL STABILIZATION UNIT

This application is a divisional application of U.S. application Ser. No. 11/302,910, which was filed on Dec. 14, 2005 now U.S. Pat. No. 7,571,596.

BACKGROUND OF THE INVENTION

This invention relates to a vacuum system for incorporating a fuel stabilization unit (FSU) into a turbine engine for use on an aircraft.

It is common practice to use fuel as a cooling medium for various systems onboard an aircraft. The useable cooling capacity of a particular fuel is limited by the formation of insoluble products referred to as "coke". The formation of coke deposits is dependent on the amount of dissolved oxygen present within the fuel due to prior exposure to air. Reducing the amount of oxygen dissolved within the fuel decreases the rate of coke deposition and increases the maximum allowable temperature of the fuel.

FSUs are utilized in turbine engines to remove dissolved oxygen from a fuel supply. One method of removing dissolved oxygen from fuels is using a membrane de-oxygenator. In a membrane de-oxygenator, fuel is pumped along an oxygen permeable membrane. As the fuel passes the membrane a vacuum created on the opposing side of the membrane pulls oxygen and other contaminants out of the fuel and through the membrane. The contaminants pulled from the fuel result in a mixture including oxygenated hydrocarbons. Although the overall level of the discharge is fairly small, the mixture is an environmental safety hazard and cannot be discharged into the atmosphere.

Using an oxygen permeable membrane to remove the dissolved oxygen from the fuel requires the creation of a vacuum within the fuel stabilization unit. Due to the quality of vacuum required, a multi-stage vacuum pump must be used. Multi-stage vacuum pumps are expensive and add to the overall weight of the aircraft. As can be appreciated, space aboard an aircraft is limited and any increase in device size affects overall configuration and operation.

An apparatus and method for creating a vacuum in a fuel stabilization unit and for handing the discharge from a fuel stabilization unit is needed.

SUMMARY OF THE INVENTION

Oil system components for a turbine engine are used to provide a vacuum system for a fuel stabilization unit (FSU).

A fuel system is used in delivering fuel to a gas turbine engine. Fuel passes through the FSU for filtering prior to injection into the engine. Fuel flows through a fuel inlet into a fuel chamber in the FSU. Dissolved oxygen and other contaminants are filtered through an oxygen permeable membrane into a vacuum chamber as a result of vacuum pressure.

A vacuum system pulls discharge from the vacuum chamber through a vacuum outlet, and toward a vacuum pump. Due to the quality of vacuum required a two-stage vacuum pump is needed. A first stage vacuum pump is an oil system scavenge pump for the turbine engine. Utilizing the oil system scavenge pump to provide the first stage vacuum pump reduces the amount of hardware to be added to the engine. The second stage is provided by a second stage vacuum pump. The discharge flows from the vacuum chamber through to the second stage vacuum pump and is added to the oil supply within the oil sump.

Although an environmental hazard that cannot be dumped to the environment, the discharge is minimal when compared with the amount of oil within the oil system. The discharge mixes with the unclean oil that has come from the other engine components. The oil and discharge mixture is sent from the oil sump through a de-oiler and a de-aerator to clean the oil supply prior to pumping the oil back through the oil system. Handling the discharge by using engine components that are already in use eliminates the need of adding equipment to operate the FSU.

These and other features of the present invention can be best understood from the following specification and drawings, the following of which is a brief description.

DETAILED DESCRIPTION OF THE PREFERRED EMBODIMENT

Figure 1:
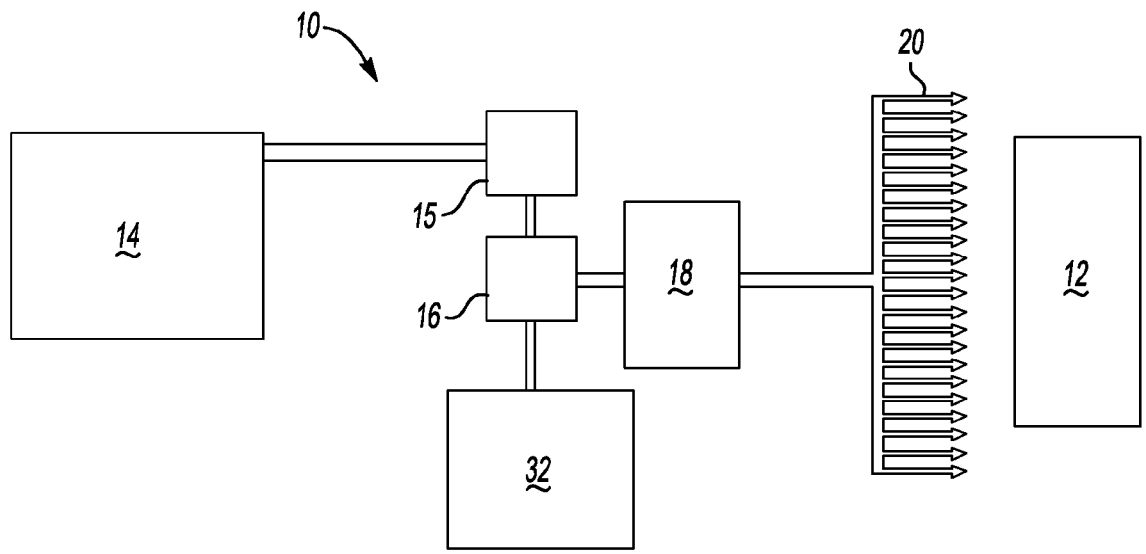
FIG. 1 shows a fuel delivery system for a turbine engine.

A fuel delivery system 10 is shown schematically in FIG. 1. The system 10 is preferably for use in delivering fuel to a gas turbine engine 12. Fuel from a fuel supply 14 passes through a boost pump 15 to a fuel stabilization unit (FSU) 16 for filtering the fuel. The fuel flows from the FSU 16 through a pressure regulator 18 and is discharged from fuel nozzles 20 into the engine 12.

Figure 2:
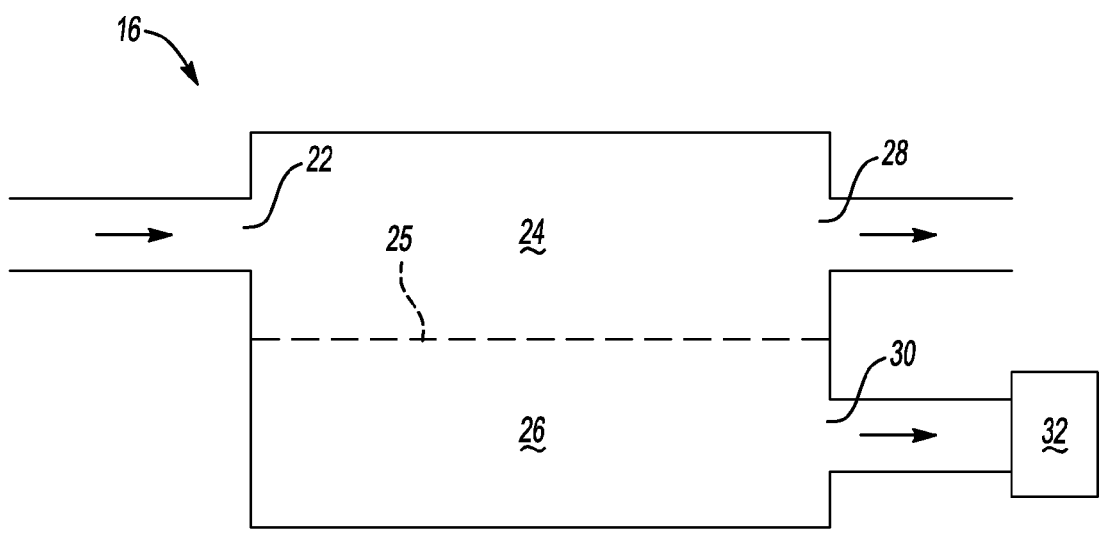
FIG. 2 is a schematic illustration of a fuel stabilization unit.

FIG. 2 schematically illustrates the FSU 16. Fuel flows through a fuel inlet 22 into a fuel chamber 24. Dissolved oxygen and other contaminants are filtered through an oxygen permeable membrane 25 into a vacuum chamber 26 as a result of vacuum pressure created within the vacuum chamber 26. The fuel within fuel chamber 24 flows out of the FSU 16 through the fuel outlet 28 and continues through the system toward the engine 12. Discharge within the vacuum chamber 26 flows out through the vacuum outlet 30 toward a vacuum pump 32.

Figure 3:
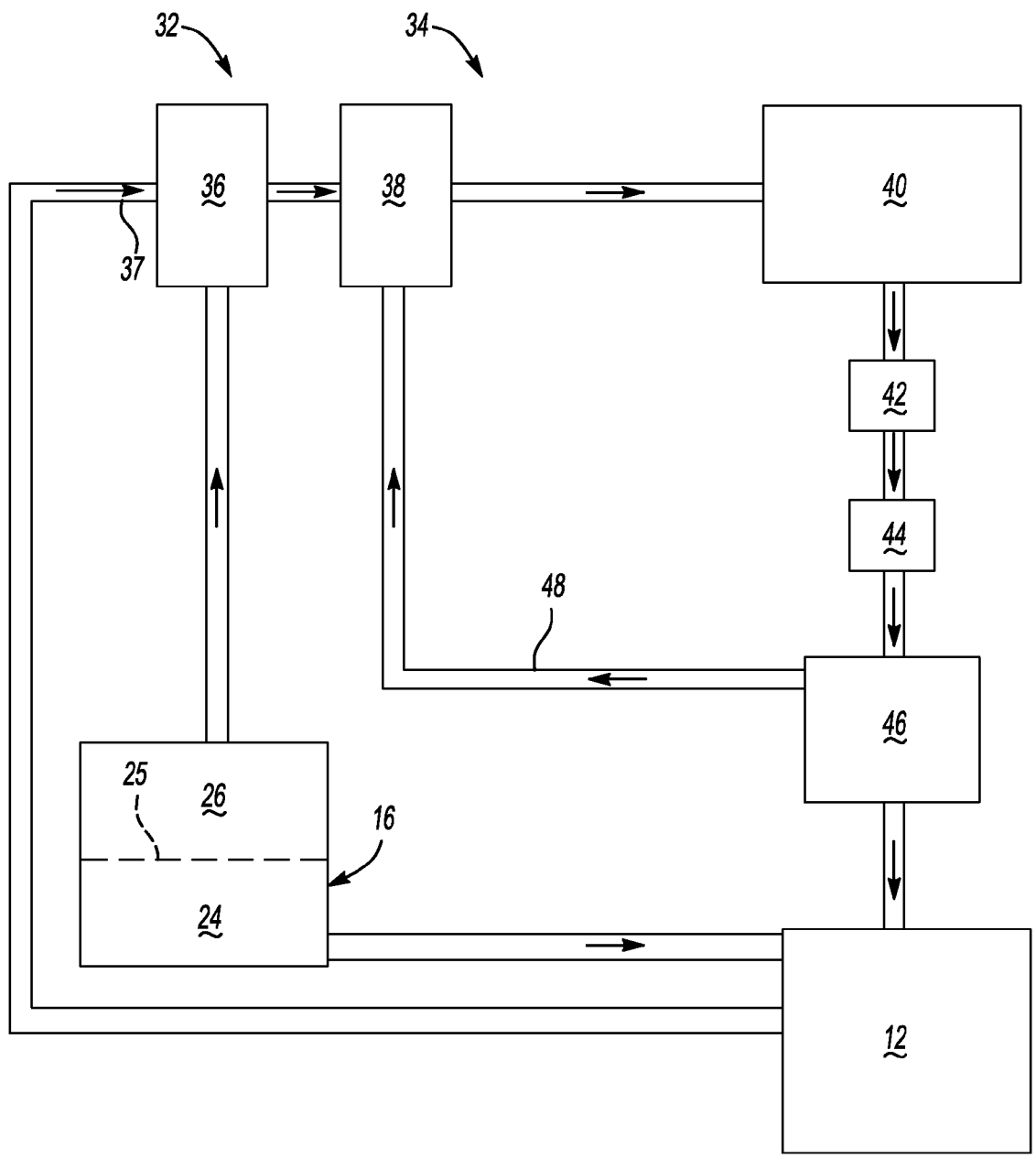
FIG. 3 is a schematic illustration of a vacuum system of the present invention.

FIG. 3 is a schematic view illustrating a vacuum system 34 for use in a turbine engine 12 with the FSU 16 described above. Due to the quality of vacuum required a two-stage vacuum pump 32 is needed. The vacuum system 34 includes a first stage vacuum pump 36 and a second stage vacuum pump 38. The first stage vacuum pump 36 performs as a "hogging" stage and the second stage vacuum pump 38 performs as a "fine" vacuum stage, as is know for multi-stage vacuum pumps. The first stage vacuum pump 36 is an oil system pump or, as shown, an oil system scavenge pump for the turbine engine 12.

The oil system is used to lubricate and cool components of the engine 12. The oil scavenge pump 36 is used to pump oil from the various components of the engine 12 back to an oil sump 40. The connections from the various components of the engine 12 to the oil scavenge pump 36 are illustrated by oil line 37. In the embodiment shown the oil sump 40 is a gearbox, but may be an electronic drive or other method of providing drive to the oil system. The oil supply returned to the oil sump 40 must be cleaned before sending the oil back to the engine 12 components. The oil supply passes through a de-oiler 42 and a de-aerator 44 to clean the oil supply prior to an oil pump 46 sending the oil back through the oil system.

As shown the oil pump 46 sends the cleaned oil to the engine 12 and various components. Also, oil is delivered to the vacuum pump 38 for sealing through line 48. Other components of the engine are connected to the oil system for sealing and cooling. Then the oil system scavenge pump 36 is used to pump the contaminated oil from the various engine 12 components back to the oil sump 40 to be cleaned and cycled again.

The first stage vacuum pump 36 and the second stage vacuum pump 38 pump oil toward the oil sump 40 and create a vacuum within the vacuum chamber 26. The vacuum pulls the dissolved oxygen and other contaminants through the oxygen permeable membrane 25. The discharge flows from the vacuum chamber 26 through to the first stage vacuum pump 36 and second stage vacuum pump 38, where it is added to the oil supply sent to the oil sump 40. The discharge must flow from the vacuum chamber 26 to a lower pressure area within the engine 12. The oil sump 40 actually has a negative pressure for pulling the oil supply in and is an ideal location for adding the discharge to the oil system, although another low pressure area could be utilized.

The volume of the discharge is minimal when compared to the amount of oil within the oil system. The discharge added to the oil supply within the oil sump 40 mixes with the unclean oil that has come from the other components of the engine 12. The oil and discharge mixture is sent from the oil sump 40 through the de-oiler 42 and de-aerator 44 to clean the oil supply prior to pumping the oil back through the oil system. Handling the discharge by using components of the engine 12 that are already in use eliminates the need of adding costly equipment for managing the discharge.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of cleansing fuel within a turbine engine comprising:
   a) removing contaminants from a fuel supply using a membrane fuel stabilization unit; and
   b) discharging the contaminants into an oil supply system for the turbine engine.

2. The method of claim 1, wherein said step a) includes using an oil system component to provide a vacuum for removal of contaminants.

3. The method of claim 2, wherein said oil system component is an oil pump for moving oil from a component back to an oil sump.

4. The method of claim 3, wherein said step a) includes providing a second stage vacuum for the fuel stabilization unit.

5. The method of claim 1, further comprising:
   c) cleansing the oil supply and the contaminants using an oil system de-oiler and an oil system de-aerator.

6. A method of cleansing fuel within a turbine engine comprising:
   a) removing contaminants from a fuel supply using a membrane fuel stabilization unit;
   b) discharging the contaminants into an oil supply system for the turbine engine; and
   c) cleansing the oil supply and the contaminants using at least one of an oil system de-oiler and an oil system de-aerator.

7. The method of claim 6, wherein said step a) includes using an oil system component to provide a vacuum for removal of contaminants.

8. The method of claim 7, wherein said oil system component is an oil pump for moving oil from a component back to an oil sump.

9. The method of claim 8, wherein said step a) includes providing a second stage vacuum for the fuel stabilization unit.

10. The method of claim 9, further comprising:
    d) sealing a pump that provides the second stage vacuum with the oil.

11. The method of claim 4, further comprising:
    c) sealing a pump that provides the second stage vacuum with the oil.

* * * * *